United States Patent
Dong et al.

(10) Patent No.: US 8,220,699 B2
(45) Date of Patent: Jul. 17, 2012

(54) APPARATUS AND METHOD FOR PROVIDING AN INERTING GAS DURING SOLDERING

(75) Inventors: Chun Christine Dong, Macungie, PA (US); Gregory Khosrov Arsianian, Pipersville, PA (US); Ranajit Ghosh, Macungie, PA (US); Victor Wang, Guangzhou (CN); Jerry Wu, Shanghai (CN)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 13/040,594

(22) Filed: Mar. 4, 2011

(65) Prior Publication Data

US 2012/0055980 A1    Mar. 8, 2012

Related U.S. Application Data

(60) Provisional application No. 61/313,376, filed on Mar. 12, 2010, provisional application No. 61/313,372, filed on Mar. 12, 2010, provisional application No. 61/321,011, filed on Apr. 5, 2010, provisional application No. 61/320,939, filed on Apr. 5, 2010, provisional application No. 61/323,607, filed on Apr. 13, 2010, provisional application No. 61/365,607, filed on Jul. 19, 2010.

(51) Int. Cl.
   *B23K 31/02* (2006.01)
(52) U.S. Cl. ............. 228/219; 228/37; 228/42; 228/260
(58) Field of Classification Search .................. None
   See application file for complete search history.

(56) References Cited

U.S. PATENT DOCUMENTS

| | | | |
|---|---|---|---|
| 5,121,874 A * | 6/1992 | Deambrosio et al. | 228/219 |
| 5,121,875 A | 6/1992 | Hagerty et al. | |
| 5,176,307 A | 1/1993 | Hagerty et al. | |
| 5,203,489 A * | 4/1993 | Gileta et al. | 228/219 |
| 5,240,169 A * | 8/1993 | Gileta | 228/180.1 |
| 5,292,055 A | 3/1994 | Gileta | |
| 5,294,036 A * | 3/1994 | Den Dopper | 228/37 |
| 5,361,969 A * | 11/1994 | Gileta | 228/180.1 |
| 5,409,159 A | 4/1995 | Connors et al. | |
| 5,411,200 A | 5/1995 | Connors et al. | |
| 5,419,482 A * | 5/1995 | Hendrikx | 228/37 |
| 5,509,598 A * | 4/1996 | Nayar et al. | 228/180.1 |
| 5,568,894 A | 10/1996 | Gileta | |

(Continued)

FOREIGN PATENT DOCUMENTS

CZ    294717    1/2005

(Continued)

*Primary Examiner* — Kiley Stoner
(74) *Attorney, Agent, or Firm* — Rosaleen P. Morris-Oskanian

(57) ABSTRACT

Described herein is an apparatus and method for providing an inerting gas during the application of soldering to a work piece. In one aspect, there is provided an apparatus that is placed atop of a solder reservoir and comprises a plurality of porous tubes that are in fluid communication with an inerting gas. In another aspect, there is provided a method for providing an inerting gas to a wave soldering apparatus comprising the steps of, among other things, placing an apparatus atop at least one edge of the solder reservoir wherein the apparatus comprises a plurality of tubes comprising one or more openings in fluid communication with an inerting gas source. In a further aspect, at least one of the tubes comprises a non-stick coating or is comprised of a porous non-stick material such as a sleeve.

12 Claims, 9 Drawing Sheets

U.S. PATENT DOCUMENTS

| | | | |
|---|---|---|---|
| 5,617,990 A * | 4/1997 | Thompson, Sr. | 228/180.1 |
| 6,234,380 B1 | 5/2001 | Heine | |
| 6,352,190 B1 * | 3/2002 | Lucht et al. | 228/37 |
| 2001/0020637 A1 | 9/2001 | Zen | |
| 2008/0067219 A1 * | 3/2008 | Barengo et al. | 228/219 |
| 2008/0277457 A1 * | 11/2008 | Mastele et al. | 228/219 |
| 2008/0302861 A1 * | 12/2008 | Szymanowski et al. | 228/223 |
| 2010/0059575 A1 * | 3/2010 | Isler et al. | 228/219 |
| 2010/0147930 A1 * | 6/2010 | Willemen | 228/203 |
| 2011/0226843 A1 * | 9/2011 | Yanaros et al. | 228/260 |

FOREIGN PATENT DOCUMENTS

| | | |
|---|---|---|
| EP | 0685287 | 6/1995 |
| EP | 0713742 | 5/1996 |
| JP | 09-008448 A * | 1/1997 |
| JP | 11-123541 A * | 5/1999 |
| WO | 9210323 | 6/1992 |
| WO | 9311653 | 6/1993 |
| WO | 0204161 | 1/2002 |

* cited by examiner

Fig. 23a and Fig. 23b. Concentric Slotted Tubes Bottom Cover

APPARATUS AND METHOD FOR PROVIDING AN INERTING GAS DURING SOLDERING

CROSS-REFERENCE TO RELATED APPLICATIONS

This application claims the priority benefit of the following applications: U.S. Provisional Application No. 61/313,376, filed 12 Mar. 2010; U.S. Provisional Application No. 61/313,372, filed 12 Mar. 2010; U.S. Provisional Application No. 61/321,011 filed 5 Apr. 2010; U.S. Provisional Application No. 61/320,939 filed 5 Apr. 2010; U.S. Provisional Application No, 61/323,607 filed 13 Apr. 2010; and U.S. Provisional Application No. 61/365,607 filed 19 Jul. 2010.

BACKGROUND OF THE INVENTION

Described herein is an apparatus and a method for providing an inerting gas during soldering. More specifically, described herein is an apparatus and a method for providing an inerting gas during wave soldering using nitrogen and/or other inerting gas.

Work pieces such as printed wiring boards or circuit boards have increasingly smaller wettable surfaces that need to be solder coated and joined. Typical operations for wave soldering involve a soldering bath through which the printed circuit boards or work pieces to be soldered as transported. A conventional automatic wave soldering apparatus includes a flux application, a preheater, and a solder station that are arranged to process printed circuit boards. The printed circuit boards are transported along a moving track or conveyor with their side edges supported by gripping fingers. Flux may be applied by contacting the board with either a foam or spray of flux. The circuit board is then passed through a pre-heating area in order for the flux to reduce the oxides on the metal surfaces to be soldered. The circuit board is then contacted with single or multiple waves of molten solder in an air or in an inerting gas atmosphere.

The inerting gas atmosphere typically is nitrogen ($N_2$) and/or other inerting gases and is oftentimes called $N_2$ inerting. Soldering within an inert gas and/or nitrogen atmosphere minimizes the formation of dross or oxides on the surface of the solder. The presence of a dross and/or an oxide layer is known to cause skips, bridges, or other defects in solder joints. Proximal to the solder waves—which are produced by the wave soldering apparatus during operation—are porous pipes or tubes which run parallel to the solder wave and are used to transport the inerting gas and/or $N_2$ gas to provide a relatively low oxygen atmosphere, particularly underneath the work piece to be soldered.

For lead-free wave soldering, the value of an inerting gas atmosphere comprising $N_2$ is further increased due to the following reasons. The process temperature by using a common lead-free solder is significantly higher than that of conventional tin-lead solder due to the increased melting points of commonly used lead-free solders. The increase in process temperature promotes dross formation. Furthermore, the cost of a lead-free solder is normally much higher than that of the conventional tin-lead solder, and the economy loss associated with solder waste by dross formation is more significant than that of lead-free wave soldering. In addition, the wetting performance of a lead-free solder is intrinsically poor compared with that of the conventional tin-lead solder. Therefore, the quality of the formed solder joints is more sensitive to the state of oxidation on a lead-free solder surface.

It is well known that inerting in wave soldering can significantly reduce dross formation on the molten solder surface. Reducing dross formation not only saves solder material and lessens maintenance requirement, but also improves solder wetting and ensures the quality of the formed solder joints. To apply an inerting atmosphere in an existing wave soldering machine, one common approach is to insert into the molten solder reservoir a cage-like protective housing with diffusers mounted inside. An inerting gas blanket across the solder reservoir can be formed, thus, reducing the tendency of solder oxidation.

The diffusers are commonly made of porous tubes to introduce an inerting gas such as $N_2$ and/or other inerting gases into the soldering station. The porous tubes, however, become easily clogged by solder splashing or flux vapor condensation during the wave soldering process. Once the diffuser tube is clogged, the efficiency of inerting will be largely reduced. Present methods of cleaning the diffuser tubes such as, for example, using ultrasonic baths filled with cleaning solutions, are extremely difficult and time consuming. The cleaning of these tubes must be performed on a regular basis and can cause physical damage to the tubes. To avoid these issues, the diffuser tubes are typically replaced once they become clogged rather than cleaned. This increases the overall cost to the end-user.

Accordingly, in order to promote the application of inerting by $N_2$ and/or other inerting gases in wave soldering, it is desirable that the apparatus, method, or both fulfill at least one or more of the following objectives. First, it is desirable that the inerting apparatus and method reduces $N_2$ or other inerting gas consumption such as, but not limited to, 12 cubic meter per hour ($m^3$/hr) or less to meet the cost benefits of applying the technology. Second, it is desirable that the inerting apparatus and method reduces the concentration of $O_2$ above the molten solder surface such as, but not limited to, 2500 parts per million (ppm) or less. Third, it is desirable that the inerting apparatus and method uses an apparatus that is simple to install and maintain to minimize retrofitting cost. Moreover, it is desirable that the apparatus or method reduces or eliminates the clogging of the porous diffuser tube to ensure a stable and long lasting inerting performance.

BRIEF SUMMARY OF THE INVENTION

The apparatus and method described herein fulfills at least one or more of the above objectives for inerting using nitrogen and/or other inerting gases that may be more cost effective and user friendly than comparable methods and apparatuses presently in use.

In one embodiment, there is provided an apparatus for providing an inerting gas during soldering of a work piece comprising: at least one groove on a bottom surface of the apparatus for placing atop of at least one edge of a solder reservoir comprising molten solder wherein at least one side wall of the groove and at least one wall of the apparatus defines a chamber outside of the solder reservoir; at least one opening on a top surface of the apparatus through which at least one solder wave emitting from the solder reservoir passes through and contacts the work piece as it travels on a moving track; and a plurality of tubes comprising one or more openings in fluid communication with an inerting gas source wherein at least one of the tubes resides within the chamber wherein the apparatus is positioned above the solder reservoir and underneath the work piece to be soldered thereby forming an atmosphere and wherein there is substantially no gap between the work piece to be soldered and an apex of the at least one solder wave. In one particular embodiment, the apparatus further comprises a thermally conductive protrusion wherein at least a portion of the protrusion contacts the molten solder and at least one tube. In this embodiment or another embodiment, an optional cover is placed atop of the apparatus through which the work piece travels therethrough wherein the cover further comprises a vent which is in communication with a ventilation system.

In another aspect, there is provided a method for providing an inerting gas atmosphere during wave soldering of a work piece comprising: providing a wave soldering machine comprising: a solder reservoir having molten solder contained therein, at least one nozzle, at least one pump to generate at least one solder wave from the molten solder bath upwardly through the nozzle; placing an apparatus atop at least one edge of the mouth of the solder reservoir wherein the apparatus comprises at least one opening on a top surface, at least one groove that rests atop the at least one edge of the solder reservoir, and a plurality of tubes comprising one or more openings in fluid communication with an inerting gas source, wherein the work piece to be soldered and the top surface of the apparatus define an atmosphere and wherein there is substantially no gap between the work piece to be soldered and an apex of the at least one solder wave; passing a work piece along a path so that at least a portion of the work piece contacts the at least one solder wave emitting through the opening of the apparatus; introducing an inerting gas through the porous tubes and into the atmosphere, wherein at least one tube contacts a portion of a thermally conductive protrusion which is inserted into the molten solder whereby the at least one tube is heated to a temperature to is at or above the temperature of the molten solder. In one particular embodiment, at least one of the tubes further comprises a non-stick coating or a porous sleeve comprising a non-stick material.

BRIEF DESCRIPTION OF SEVERAL VIEWS OF THE DRAWINGS

FIG. 4 provides an isometric view of the embodiment of the apparatus depicted in FIG. 3a.

DETAILED DESCRIPTION OF THE INVENTION

Figure 1:
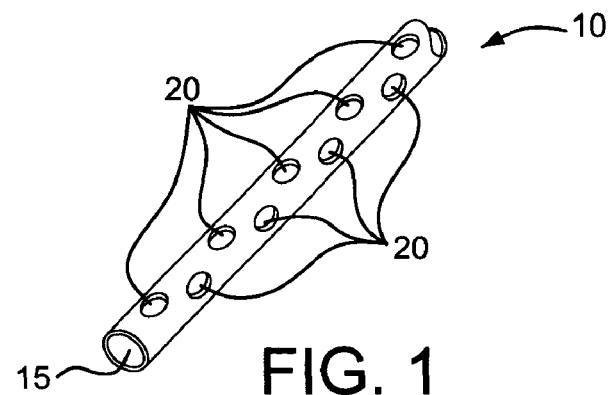
FIG. 1 provides an isometric view of an embodiment of a diffuser tube comprising pores or a porous tube described herein.

At least one or more of the objectives in the art are fulfilled by the method and apparatus described herein for inerting protection during soldering. The apparatus and method described herein provides inerting protection during soldering, particularly for those embodiments where significant movement and swirling of the solder during soldering of work pieces such as printed circuit boards and increased oxidation of its surface may occur. It is anticipated that the apparatus and method described herein can be used, for example, to retrofit an existing wave soldering machine. In certain embodiments, the apparatus described herein in operation is placed over the solder reservoir and under the moving track or other conveyance mechanism for transporting the work pieces to be soldered. In certain embodiments, there is substantially no gap between the work piece to be soldered and the apex of the at least one solder wave. In other embodiments, there is a gap between the work piece to be soldered and the apex of the at least one solder wave. The plurality of diffuser pipes housed within the apparatus are in fluid connection to an inerting gas source such as nitrogen, inert gas (e.g., helium, neon, argon, krypton, xenon, and combinations thereof), forming gas (e.g., mixture of nitrogen and hydrogen comprising up to 5% by weight of hydrogen), or combinations thereof to provide an inerting atmosphere. One objective of the apparatus and method described herein is a reduced concentration of oxygen ($O_2$) in the atmosphere defined by the work piece surface to be soldered and the surface of the molten solder contained within the solder reservoir such as, but not limited to, 2500 parts per million (ppm) or less.

The apparatus and method described herein is intended to be placed atop of a solder reservoir containing molten solder that is maintained at or above (e.g., up to 50° C.) the solder's melting point. The apparatus described herein has an internal volume that sets atop of the solder reservoir thereby defining an atmosphere between the work piece to be soldered that is conveyed in one direction on a moving track above the solder reservoir and the molten solder surface. In certain embodiments, the work pieces are supported by a moving track or conveyor fingers at side edges and the fingers pass through the solder wave(s). In other embodiments, the work pieces are supported on pallets, fixtures, or frames as they are conveyed through the wave soldering machine. The solder reservoir has one or more nozzles therein that project one or more solder waves that are generated by a solder pump. The solder pump is typically a variable speed pump that allows the end user to control the flow of solder from the solder wave(s) and raise or lower the apex or crest of the solder wave(s) to suit processing conditions. The one or more solder waves contact the surface of the work piece to be soldered through one or more openings in the top surface of the apparatus described herein. During this process, the apparatus houses a plurality of diffuser tubes comprising an opening, aperture, slot, perforations, or pores that are in fluid communication with an inerting gas source such as $N_2$ that pass through the interior volume of the tube and out through the opening or pores of the tubes into the atmosphere. In doing so, the under surface, front edge, back edge and side edges of the work piece are uniformly blanketed by the inerting gas as the work piece passes through the solder wave(s).

In certain embodiment of the apparatus and method described herein, the size of the apparatus placed atop the solder reservoir is minimized to intensify the inerting efficiency around the moving solder waves. In this or other embodiments, the static molten solder surface, or area outside of the footprint of the apparatus in the solder reservoir, can be covered by a high temperature material that can withstand the temperature of the molten solder contained within the solder reservoir.

The apparatus and method described herein comprises a plurality of diffuser tubes comprising an interior volume and one or more openings which can be, but is not limited to, pores, holes, slots, vents, apertures, perforations or other means that allow for the passage of nitrogen and/or other inerting gas within the interior volume of the tube and out through the openings of the tube. In one particular embodiment, the tubes are porous and comprise an average pore size of about 0.2 microns (μm) or less to provide a laminar flow of inerting or $N_2$ gas out of the porous tube. In this or other embodiments, the tubes are in fluid communication with an inerting gas source that supplies the inerting gas such as, for example, $N_2$ through the interior volume of the tube and out through the openings or pores of the tubes into the area defined by the surface of the molten solder in the reservoir and conveyed work pieces.

As previously mentioned, the apparatus described herein comprises a housing that contains a plurality of diffuser tubes and an interior volume. In certain embodiments, the tubes may be located between the plurality of solder waves, at the board entrance side of the solder reservoir, at the work piece exit side of the solder reservoir, perpendicular to the direction of the solder wave, or combinations thereof. In these embodiments, there is substantially no gap between the surface of the work piece to be soldered and that of the solder waves. In certain embodiments, one or more of the tubes, such as those embodiments wherein one or more of the tubes resides between a plurality of soldering waves, may further comprise a metal protrusion or fin wherein at least a portion of the protrusion contacts the molten solder and in thermal conduction with the tube. In this connection, the metal protrusion or fin that allows the temperature of the tube that it is connected to be above the melting point of the solder to avoid clogging caused by, for example, soldering splashing and/or flux vapor condensation. In certain embodiments, the metal protrusion or fin that contacts the one or more tubes and the molten solder may be a part of the vertical wall of the apparatus. In this or other embodiments, an additional tube may be located inside and/or outside of the solder bath. The use of one or more metal protrusions that are thermally conductive between at least one tube and the molten solder bath avoids the problems associated in the prior art with immersion and/or contacting the porous tube with the solder bath.

In one particular embodiment of the apparatus and method described herein, one or more of the plurality of diffuser tubes, such as, but not limited to, the center diffuser tube in between a plurality of solder waves, comprises a non-stick coating. An example of a non-stick coating is polytetrafluoroethylene (PTFE) coating, which may be found under the trademark Teflon® non-stick coating (Teflon is manufactured by DuPont, Inc. of Wilmington Del.). To maintain the passage of an inert gas through diffuser tube's surface, a porous Teflon non-stick sleeve can be applied onto at least a portion of the tube surface. In these or other embodiments, the non-stick coating selected should maintain its integrity at or above the molten solder's temperature commonly used in lead-free wave soldering process (e.g., up to about 260° C.). In a more particular embodiment, the non-stick coating is comprised of Thermolon™ non-stick coating, an inorganic (mineral based) coating which is manufactured by Thermolon Ltd. of South Korea, and which can maintain its integrity at 450° C. and avoids generating toxic vapor at elevated temperatures. In embodiment wherein the center porous tube resides between one or more pairs of soldering waves, the dissolved flux in the solder reservoir can directly contact the center diffuser surface located between the $1^{st}$ and the $2^{nd}$ waves due to a continual dynamic movement of the molten solder. When the liquid flux on diffuser surface is evaporated or thermally decomposed, solid flux residua may leave on the diffuser surface, thus causing diffuser clogging. To remedy this, a non-stick coating or a porous non-stick sleeve or a slotted metal shell coated with a non-stick coating may be applied to the porous tube or may cover at least a portion of the porous tube. It is believed that the addition of a non-stick coating, or a porous non-stick sleeve, or a slotted metal shell coated with a non-stick coating to at least one of the porous diffuser tubes may prevent the clogging of the porous tube such as the center tube by solid flux residua. The non-stick coating can also be applied to at least a portion of the internal surface of the apparatus or the internal surface of the top cover, to allow for ease of cleaning.

In yet another embodiment of the apparatus and method described herein, the apparatus further comprises an optional cover mounted on the moving track thereby forming a tunnel for the work pieces to pass therethrough. The optional cover further comprises a ventilation hole that is in fluid communication with the ventilation exhaust of the wave soldering machine that allows for the collection of flux vapor from the atmosphere underneath the cover. In one embodiment, the optional cover is made of a single layer metal cover with a center hole connected to the ventilation exhaust of the machine. In another embodiment, the optional cover is made of double layer metal sheets, and the double layer space is connected to the furnace ventilation exhaust, thus forming a boundary gas trap. In one particular embodiment, the distance between the two layers of metal sheets can range from about 1/8" to about 1/4". When a work piece or circuit board is passing underneath the cover, flux vapor generated inside the soldering area can be collected through the boundary trap, while air surrounding the solder reservoir can also be trapped in the double layer space, thereby ensuring good inerting performance. For the case of there is no work piece or circuit board on top of the solder reservoir, the inerting gas generated from the plurality of diffusers in the inerting apparatus can be sucked into volume underneath the double layer space of the cover, thereby forming a boundary inerting gas curtain to minimize air from entering into the volume.

FIG. 1 provides one embodiment of the porous tube or diffuser that is used in the apparatus and method described herein. Porous tube 10 is depicted as being cylindrical tube which has an internal volume 15 that allows for the flow of an inerting gas such as nitrogen and/or other gas such as, but not limited to, inert gas (e.g., argon, helium, neon, etc.), hydrogen, or combinations thereof, to flow therethrough and is in fluid communication with an inerting gas source (not shown). In one embodiment of porous tube 10, porous tube is made of stainless steel. However, other materials for porous tube 10 may also be applicable as long as the materials are not reactive to the solder material. Porous tube 10 is in fluid communication with the inerting gas source through a gaseous conduit or other means (not shown). Porous tube 10 further comprises a plurality of perforations 20, pores, or holes that allow for the flow of gas from the internal volume 15 through perforations 20 from the soldering bath, atmosphere defined by the surface of the molten solder (not shown) and underside of the work piece to be soldered (not shown), or combinations thereof. While porous tube 10 is shown as being cylindrical and having a circular cross-sectional, it is anticipated that other geometries, such as, but not limited to, annular, square, rectangular, elliptical, etc., may be used.

Perforations 20 are designed so that gas flow is either narrowly directed, for example, with circular holes as shown in the embodiment of FIG. 1 and distributed over the entire length of the soldering reservoir (not shown). In another embodiment, perforations 20 can be longitudinal holes or slits. In these or other embodiments, perforations 20 may be chamfered or angled to further direct the flow of gas from the internal volume 15 into the soldering bath (not shown) and/or gap between solder bath and work piece. The average pore size for perforations 20 may range from 0.05 micron to 100 micron, or from 0.1 to 10 micron, or from 0.2 to 5.0. In one particular embodiment, the mean pore size for perforations 20 is about 0.2 microns or less. The pore size and porosity of the perforations on porous tube 10 are optimized, to pursue a laminar flow of gaseous $N_2$ out of the porous tube. In these or other embodiments, a laminar flow of $N_2$ and/or other inerting gas is preferred for minimizing air intruding from boundaries of the soldering area (e.g., work piece, conveyor belt, etc.) to be inerted.

Figure 23A:
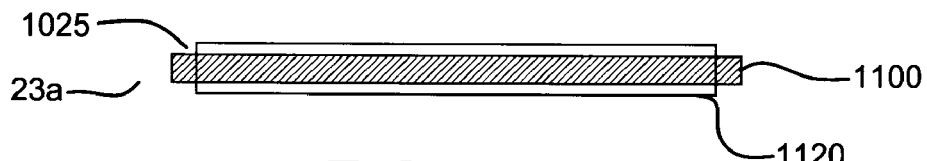
FIGS. 23a and 23b provides a side view and cross-sectional view, respectively, of an alternative embodiment of a diffuser tube.
Figure 23B:
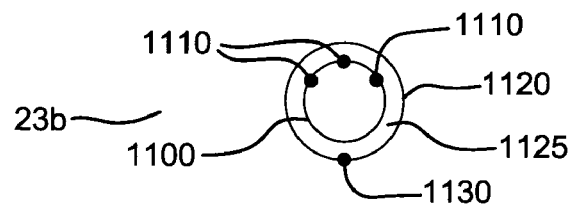

As an alternative embodiment to the porous diffuser tube, the one or more of the plurality of diffuser tubes, such as, but not limited to, the center diffuser tube between a plurality of solder waves, can be made of concentrically slotted tubes. An example of such an embodiment is provided in FIGS. 23a (side view) and 23b (cross-sectional view). In this embodiment, diffuser tube 1100 has one or more slots 1110 and is surrounded by a concentric cover 1120. The cover 1120 has one or more openings or slots 1130 that are facing downward and allow for the passage of an inerting gas therethrough. It is believed that the downward configuration of the slots can minimize the chance of liquid flux getting into the tube and clogging the one or more openings. In certain embodiments, concentric cover 1120 has a non-stick coating applied to at least a portion of its surface such as any of the coatings described herein. While diffuser tube 1100 and its surrounding cover 1120 is shown as being cylindrical and having a circular cross-sectional, it is anticipated that other geometries, such as, but not limited to, annular, square, rectangular, elliptical, etc., may be used.

Figure 3A:
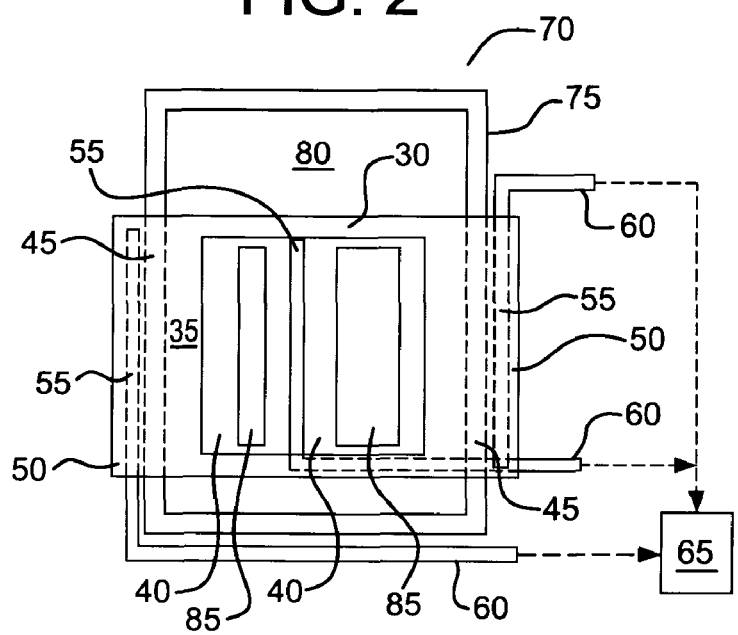
FIG. 3a provides a top view of one embodiment of the apparatus described herein.
Figure 3B:
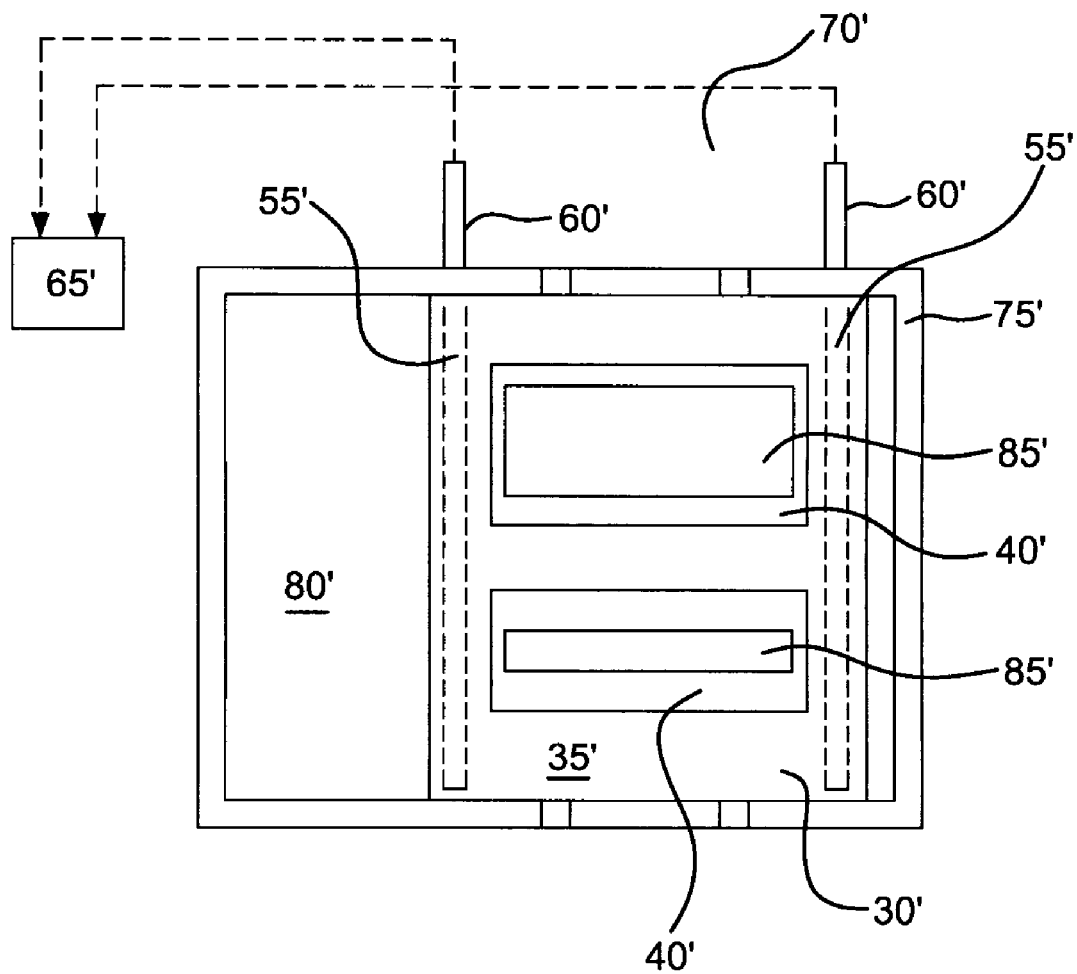
FIG. 3b provides a top view of another embodiment of the apparatus described herein.
Figure 4:
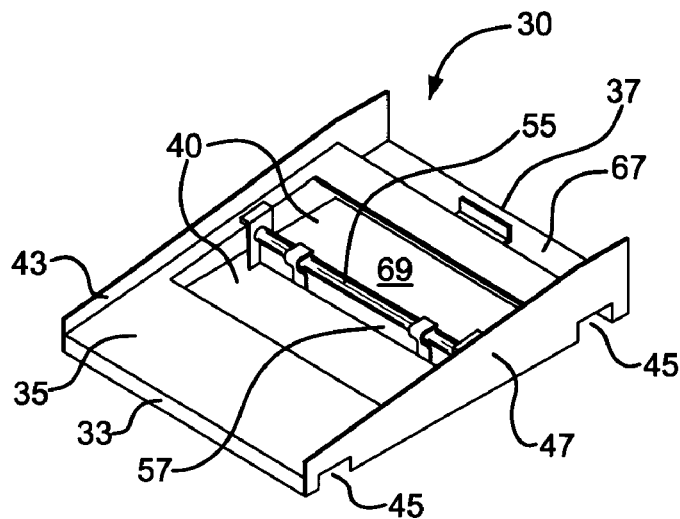

FIGS. 3a and 4 provide a top and isometric view of one embodiment of the apparatus 30 described herein. Referring to FIG. 3a, apparatus 30 is placed onto wave soldering apparatus 70 to provide an inerting gas atmosphere during a wave soldering operation. Wave soldering apparatus 70 comprises a solder reservoir 75 that contains a molten solder 80, and one or more nozzles 85 that project one or more solder waves (not shown) that are generated by a solder pump (not shown). Referring to both FIGS. 3a and 4, apparatus 30 has a top surface 35 which may be removable from the rest of the apparatus thereby making dross removal relatively easy for the end-user. Top surface 35 further comprises at least one opening 40 through which at least one solder wave emitting from molten solder 80 contained within the solder reservoir 75 passes through nozzles 85 and contacts a work piece that passes through along a moving track (not shown). Referring to FIGS. 3a and 4, apparatus 30 further comprises at least one groove 45 on the bottom of apparatus 30 (shown in dotted line in FIG. 3) that rests atop of an edge of solder reservoir 75. In certain embodiments, apparatus 30 may comprise more than one groove that allow for the placement of apparatus 30 atop of solder reservoir 75 as shown in FIGS. 3a and 4. Other embodiments of the apparatus described herein have only one groove 245 such as the embodiment depicted in FIGS. 7 and 8. Still further embodiments of the apparatus described herein do not have one or more grooves but rather a plurality of flanges that allow the apparatus to be positioned or placed on solder reservoir such as the embodiments depicted in FIGS. 11 and 14. Referring again to FIGS. 3a and 4, the sidewall of grooves 45 and the front wall 33 or back wall 37 define chambers 50 that allows for the placement of porous tubes 55 (shown in dotted line in FIG. 3) within apparatus 30. Porous tube 55 is in fluid communication via piping 60 to an inerting gas source 65. As previously mentioned, the inerting gas used with the apparatus and method described herein may comprise nitrogen, hydrogen, an inert gas (e.g., helium, argon, neon, krypton, xenon, etc.), or combinations thereof. In certain embodiments, the inerting gas is pre-heated prior to being introduced into porous tubes 55. It is understood that the embodiment shown in FIGS. 3a and 4 may vary depending upon the configuration of the wave soldering machine. Referring now to FIG. 4, apparatus 30 further comprises an interior volume 69 defined by the molten solder surface (not shown), the work piece (not shown), front wall 33, back wall 37, and side walls 43 and 47. Apparatus 30 further comprises at least one metal fin 57 that is in contact with the molten solder reservoir and at least one porous tube that acts to heat the porous tube 55 in the center to a temperature above the melting point of the molten solder.

FIG. 3b provide a top view of an embodiment of the apparatus 30' described herein wherein porous diffuser tubes 55' are oriented perpendicular to the width of the solder wave. Referring to FIG. 3b, apparatus 30' is placed onto wave soldering apparatus 70' to provide an inerting gas atmosphere during a wave soldering operation. Wave soldering apparatus 70' comprises a solder reservoir 75' that contains a molten solder 80', and one or more nozzles 85' that project one or more solder waves (not shown) that are generated by a solder pump (not shown). Apparatus 30' has a top surface 35' which may be removable from the rest of the apparatus thereby making dross removal relatively easy for the end-user. Top surface 35' further comprises at least one opening 40' through which at least one solder wave emitting from molten solder 80' contained within the solder reservoir 75' passes through nozzles 85' and contacts a work piece that passes through along a moving track (not shown). In other embodiments, the apparatus described herein may comprise a plurality of flanges that allow the apparatus to be positioned or placed on solder reservoir. Porous tubes 55' are in fluid communication via piping 60' to an inerting gas source 65'. As previously mentioned, the inerting gas used with the apparatus and method described herein may comprise nitrogen, hydrogen, an inert gas (e.g., helium, argon, neon, krypton, xenon, etc.), or combinations thereof. In certain embodiments, the inerting gas is pre-heated prior to being introduced into porous tubes 55'. It is understood that the embodiment shown in FIG. 3b may vary depending upon the configuration of the wave soldering machine.

Figure 5:
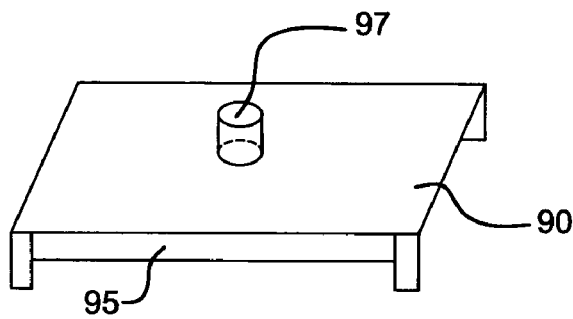
FIG. 5 provides an isometric view of an optional cover that can be installed atop of the moving track.

FIG. 5 provides an isometric view of optional cover 90 that is placed over the apparatus 30 and moving track (not shown) such that the work piece travels therethrough. Optional cover 90 is shown having a glass window 95 that allows for viewing. Optional cover 90 further has a vent 97 that is in fluid communication with the ventilation exhaust (not shown) of the wave soldering machine to remove any flux vapor within the atmosphere of the soldering station.

Figure 6:
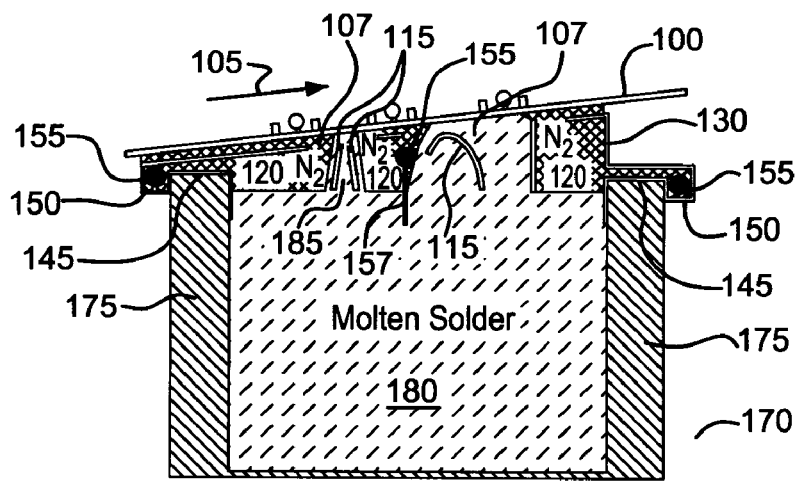
FIG. 6 provides a side view of the embodiment depicted in FIG. 3a that is mounted onto a solder reservoir.

FIG. 6 provides a side view of an embodiment of the apparatus 130 defined herein. As FIG. 6 illustrates, apparatus 130 is placed atop of wave soldering apparatus 170 by placing groves 145 onto at least one edge of solder reservoir 175 as shown. Solder reservoir 175 has molten solder 180 contained therein. A moving track (not shown) transports work pieces 100 to be soldered in an upward direction indicated in the arrow 105 shown. At least one or more solder pumps (not shown) are used to generate a plurality of solder waves 115 through nozzles 185. The plurality of solder waves 115 contact the underside of work pieces 100 through openings 107 in apparatus 130. An inerting gas is introduced into porous tube 155 that is housed in chamber 150 outside of solder reservoir 175. In the embodiment shown in FIG. 6, porous tubes 155 are located at the entrance and exit of the solder reservoir 175. In a still further embodiment, porous tube 155 can be oriented perpendicular to the direction of the solder waves (not shown). At least one of the porous tubes 155 is in connection with metal protrusion 157 which contacts molten solder 180. Inerting gas fills in the area or atmosphere shown as 120 underneath work piece 100 and depicted by cross-hatching and above the surface of molten solder 180. In the embodiment shown in FIG. 6, the apparatus has essentially no gap between work piece 100 and the apex of solder wave 115.

Figure 7:
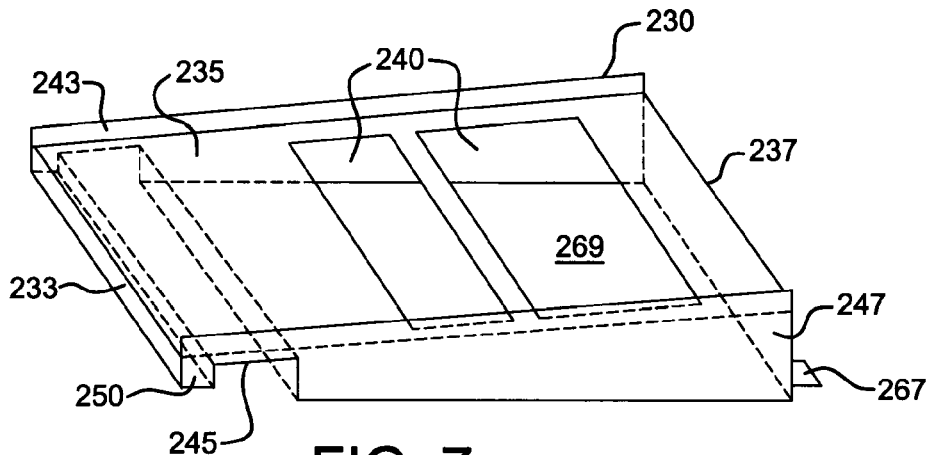
FIG. 7 provides an isometric view of an embodiment of the apparatus described herein.
Figure 8:
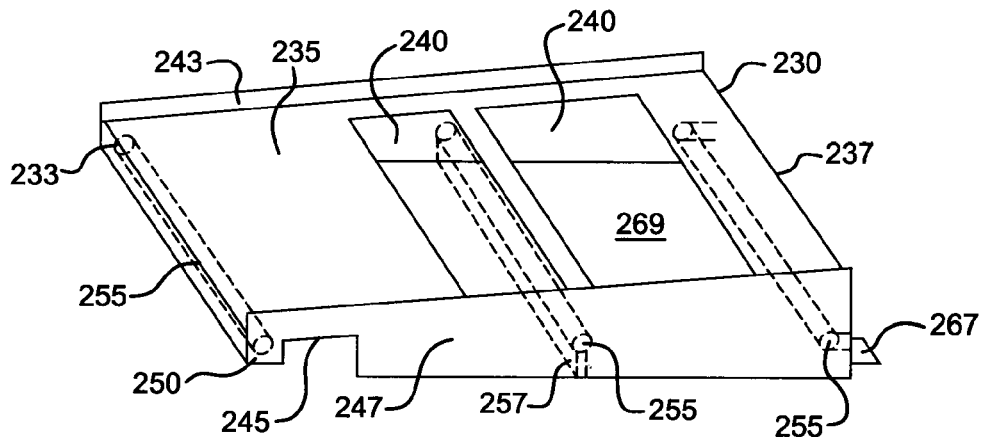
FIG. 8 provides an isometric view of the embodiment depicted in FIG. 7 that further comprises a plurality of tubes (shown in dotted line) wherein at least one of the plurality of tubes comprises a fin-like protrusion wherein at least a portion of the fin-like protrusion is in contact with the molten solder.

FIGS. 7 and 8 provide an alternative embodiment of apparatus 230 wherein there is only one groove 245 that rests upon the edge of solder reservoir (not shown). At least one of the sidewalls of groove 245 and the front wall 233 of apparatus 230 define a chamber 250 that contains porous tube 255 (shown in dotted line on FIG. 8). Apparatus 230 further comprises an interior volume 269 defined by the molten solder surface (not shown), the work piece (not shown), front wall 233, back wall 237, and side walls 243 and 247. Referring to FIG. 8, apparatus 230 further comprises at least one metal fin 257 that is in contact with the molten solder reservoir (not shown) and at least one of the porous tubes 255 (shown in dotted line) that acts to heat the porous tube 255 in the center to a temperature above the melting point of the molten solder.

Figure 9:
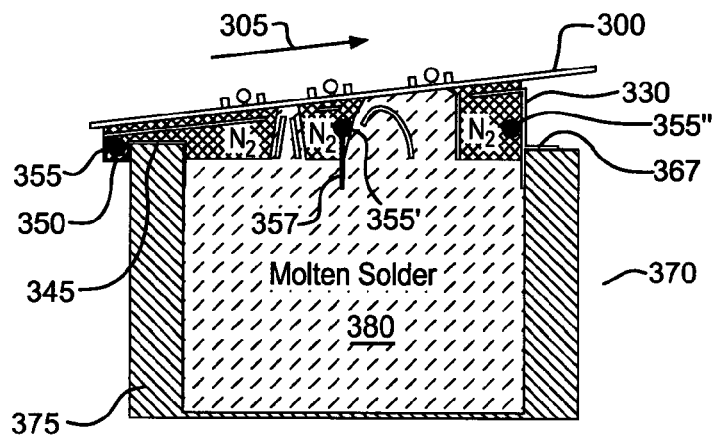
FIG. 9 provides a side view of an embodiment of the apparatus for $N_2$ inerting described herein comprising a plurality of tubes comprising one or more openings wherein at least one of the tubes comprises a fin-like protrusion in contact with the molten solder.

FIGS. 9 through 13 provide various embodiments of the apparatus described herein comprising a plurality of porous tubes. FIG. 9 provides an embodiment wherein one of the porous tubes 355 is located outside the solder reservoir 375 in cavity 350, the second porous tube 355' between the solder waves comprises a thermally conductive material 357 such as a metal fin that contacts the molten solder 380 and the second porous tube 355' and heats the second porous tube to a temperature above the solder's melting point, and the third porous tube 355" contacts the wall of the apparatus 330 which is thermally conductive or extends into molten solder 380. Apparatus 330 further contains a flange 367 which aids in positioning apparatus 330 atop of solder reservoir 375.

Figure 10:
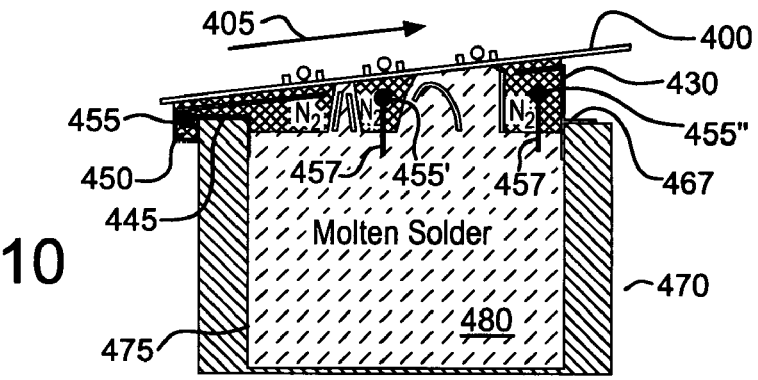
FIG. 10 provides a side view of an embodiment of the apparatus for $N_2$ inerting described herein.

FIG. 10 provides an embodiment of an apparatus 430 wherein the first porous tube 455 is outside the solder reservoir 475 in cavity 450 and both the second porous tube 455' and third porous tube 455" comprise a thermally conductive material such as a metal fin 457 that contacts the molten solder 480 and the second porous tube 455' and third porous tube 455" and heats the porous tubes to a temperature at or above the solder melting point.

Figure 11:
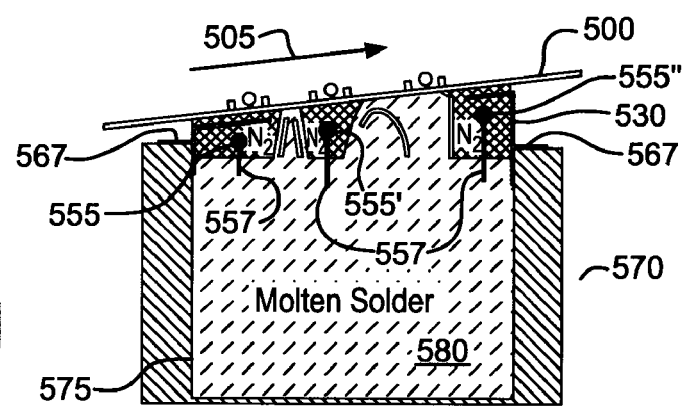
FIG. 11 provides a side view of an embodiment of the apparatus for $N_2$ inerting described herein.

FIG. 11 provides an embodiment wherein the first porous tube 555, second porous tube 555', and third porous tube 555" are inside the solder reservoir 575, and each porous tube comprises a thermally conductive material such as metal fin 557 that contacts the molten solder 580 and heats each porous tube to a temperature above the solder's melting point. Apparatus 530 does not have grooves to position the apparatus atop of solder reservoir 575. Instead, apparatus 530 has a plurality of flanges 567 that allow apparatus 530 to be placed atop of solder reservoir 575.

Figure 12:
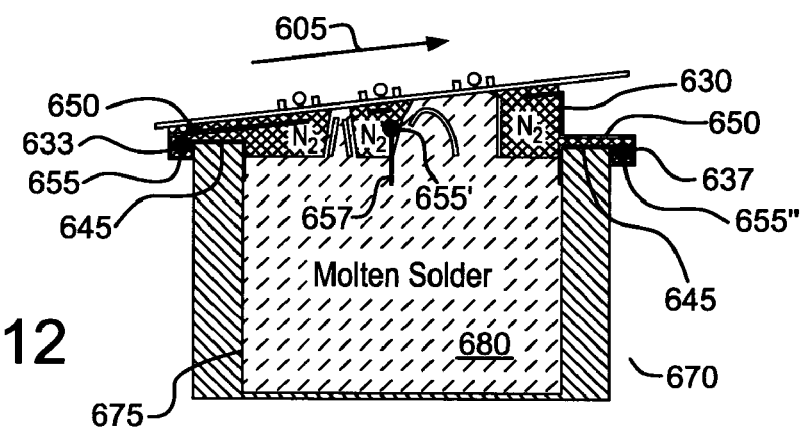
FIG. 12 provides a side view of an embodiment of the apparatus for $N_2$ inerting described herein.

FIG. 12 provides an embodiment of an apparatus 630 having a plurality of grooves 645 wherein at least one sidewall of the groove and the front wall 633 or back wall 637 of the apparatus 630 define chambers 650 wherein porous pipes 655 and 655" reside. Apparatus 630 further comprises a porous tube 655' that is contact with a thermally conductive material such as metal fin 657 that contacts the molten solder 680 and heats porous tube 655' to a temperature above the solder's melting point.

Figure 13:
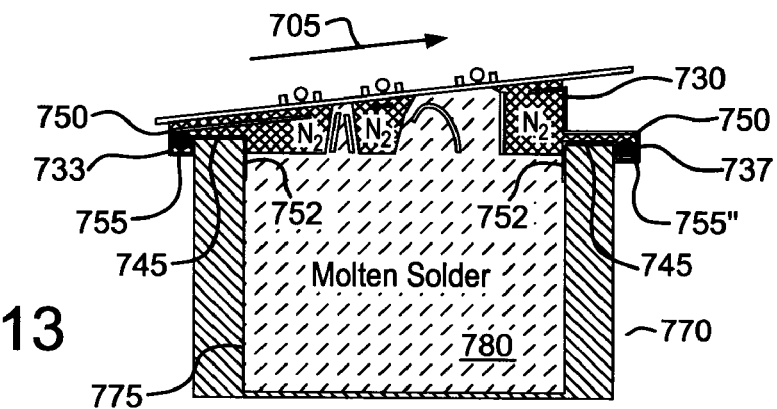
FIG. 13 provides a side view of an embodiment of the apparatus for $N_2$ inerting described herein.

FIG. 13 provides an embodiment of an apparatus 730 having a plurality of grooves 745 wherein at least one sidewall of the groove and the front wall 733 or back wall 737 of the apparatus 730 define chambers 750 wherein porous pipes 755 and 755" reside. Apparatus 730 further comprises internal flanges 752 that extend from the sidewalls of grooves 745 into the solder reservoir 780 that aid in positioning apparatus 730 atop of solder reservoir 775.

Figure 14:
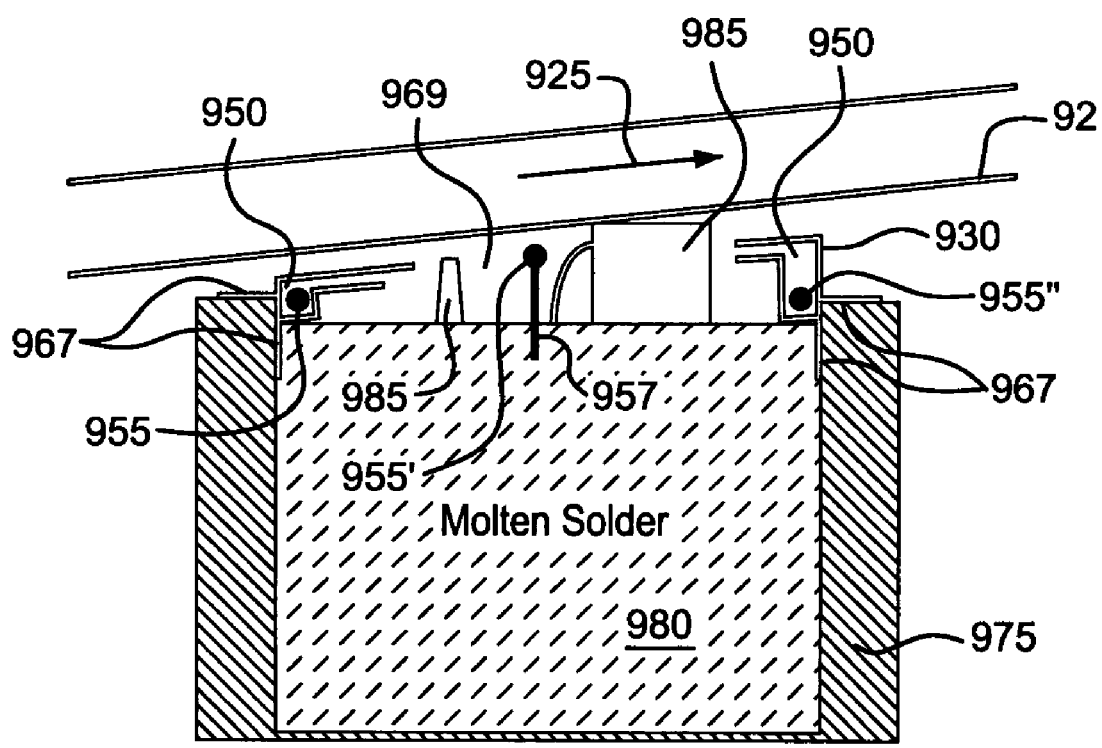
FIG. 14 provides a side view of an embodiment of the apparatus for $N_2$ inerting described herein.

FIG. 14 provides an embodiment of the apparatus 930 described herein wherein the first porous tube 955, second porous tube 955', and third porous tube 955" are inside the solder reservoir 975, and one of the porous tubes or 955' further comprises a thermally conductive material such as metal fin 957 that contacts the molten solder 980 and heats porous tube 955' to a temperature above the solder's melting point. Apparatus 930 does not have grooves to position the apparatus atop of solder reservoir 975. Instead, apparatus 930 has a plurality of flanges 967 that allow apparatus 930 to be placed atop of solder reservoir 975. Apparatus 930 is shown as being constructed of a double wall of material such as metal which define at least one chamber 950 that houses at least one of the porous tubes such as 955 and 955' shown. Work piece 923 travels above apparatus 930 in the direction indicated by arrow 925 and is contacted with a plurality of molten solder waves that are emitted from nozzles 985. The plurality of porous tubes 955, 955' and 955" are in fluid communication with an inerting gas source such as $N_2$ (not shown) which provides an inerting gas atmosphere or $N_2$ atmosphere through the tubes, into chambers 950, into the volume defined by the double layers of material of 930 and into interior volume 969 defined by the molten solder surface 980, the work piece 923, and walls of work piece 930.

Figure 15:
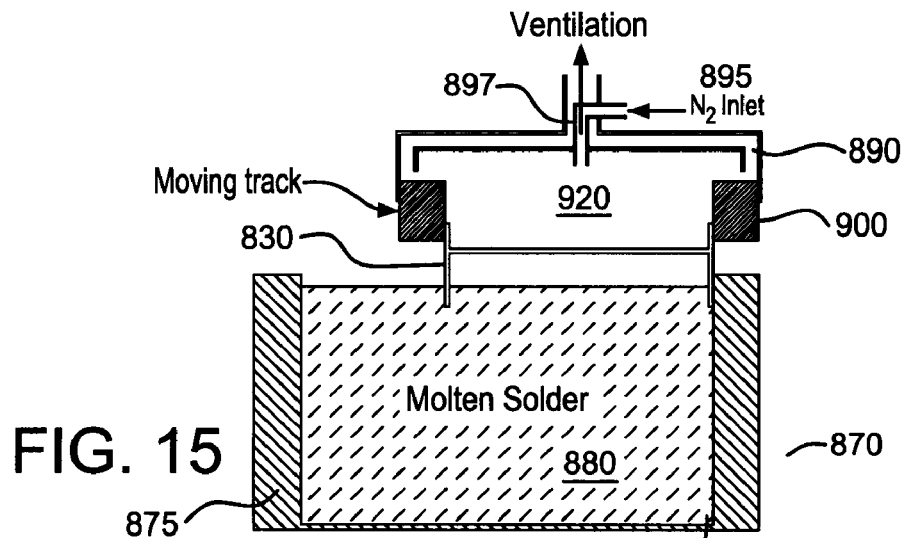
FIG. 15 provides an end view of an optional cover that can be installed on the moving track upon which the work piece travels in the embodiment depicted.
Figure 16:
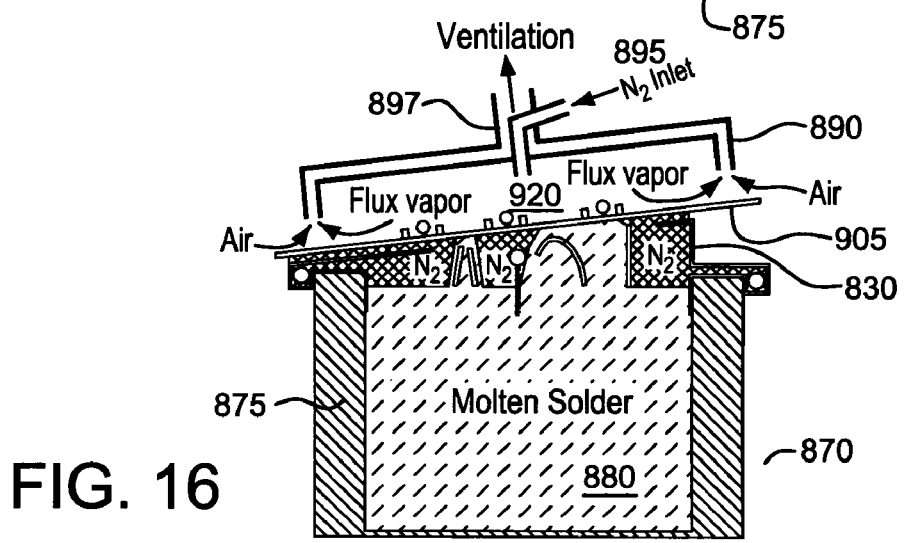
FIG. 16 provides a side view of an embodiment described in FIG. 15 that illustrates a work piece or printed circuit board passing underneath the cover.
Figure 17:
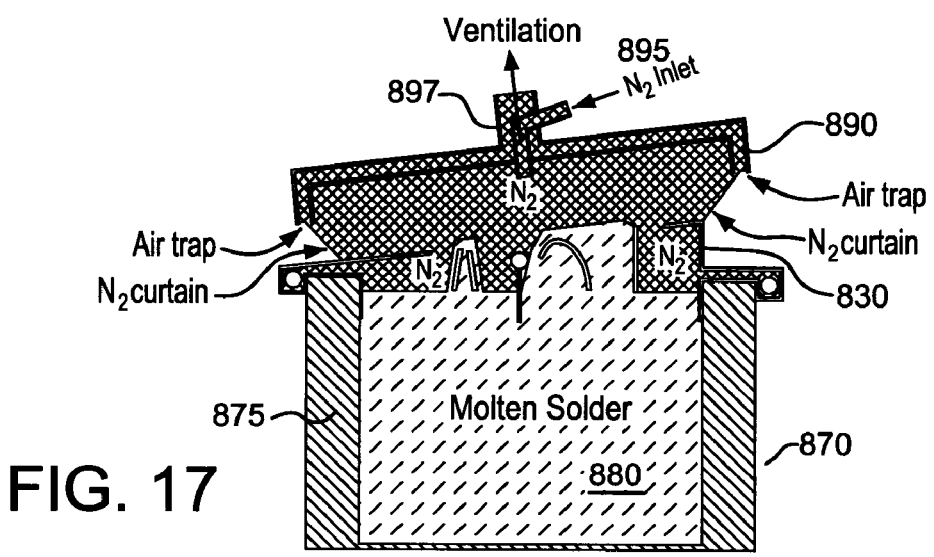
FIG. 17 provides a side view of an embodiment described in FIG. 15 where there is no circuit board passing underneath the cover.

FIGS. 15 through 17 provide an embodiment of apparatus 830 further comprising an optional cover 890 atop the solder reservoir 880 thereby forming a tunnel for the work pieces 905 (shown in FIG. 16) held on moving track 900 to pass therethrough. FIG. 15 provides an end view and FIGS. 16 and 17 provide a side view of apparatus 830. In certain embodiments, optional cover 890 is in fluid communication with the ventilation piping of wave soldering machine (not shown) Optional cover 890 is constructed of a double layer sheets, and the double layer space is connected to the furnace ventilation exhaust pipe 897, which forms a boundary gas trap. The optional cover 890 may be made of a double layer of metal sheets or other suitable materials. In certain embodiments, the distance between the two layers of sheets can range from, but not be limited to, ⅛" to ¼". In the embodiments shown in FIGS. 15 through 17, optional cover 890 may comprise an inerting gas inlet 895 that is in fluid communication with an inerting gas source (not shown) to further assist in purging flux vapor and air out of the soldering area. As shown in FIG. 16, when a circuit board is passing underneath cover 890, flux vapor generated inside the soldering area can be collected through the boundary trap, while air surrounding solder reservoir 870 can also be trapped in the double layer space underneath cover 890, which aids in ensuring a good inerting atmosphere. In instances wherein the solder reservoir 870 is not covered by a work piece 905 as shown in FIG. 17, the inerting gas generated by the plurality of porous tubes 855 can be sucked in the double layer space of the cover 890 thereby forming a boundary inerting gas curtain to minimize air from entering in from the external environment into the atmosphere 920 above the solder reservoir 880.

Figure 21:
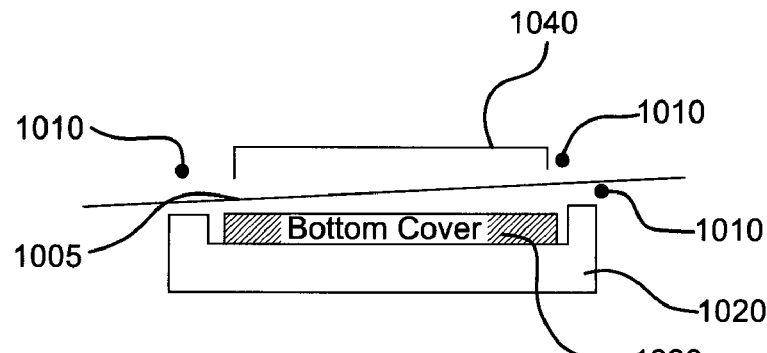
FIG. 21 provides an embodiment of the gas curtain that can be used with the method and apparatus described herein.
Figure 22A:
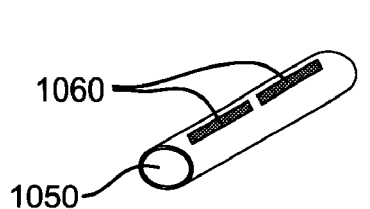
FIGS. 22a and 22b provides an embodiment of an embodiment of the diffuser tube described herein and diffuser box, respectively, wherein the diffuser tube comprises slots and is placed within a diffuser box comprising openings to allow the passage of an inerting gas therethrough.
Figure 22B:
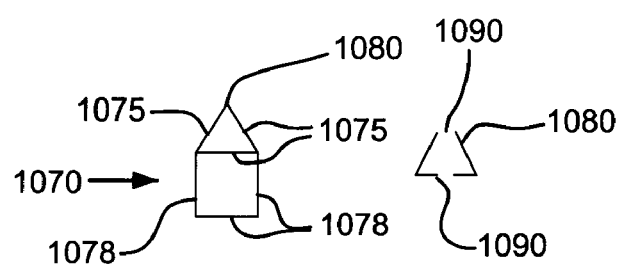

In another embodiment of the apparatus and method described herein such as the embodiment shown in FIG. 21, an inert gas curtain 1010, such as a $N_2$ and/or another inerting gas described herein, is applied at the entrance, at the exit, or both the entrance and exit of the solder reservoir 1020 to further minimize air intrusion from surroundings of the solder reservoir. It is believed that gas curtain 1010 blocks the gap on the top, or the bottom, or both the top and the bottom of the work piece 1005 (Note: 1005 should point on the straight line which is the side view of the work piece and the small rectangular should be deleted.) to be treated while it enters the solder reservoir 1020 with the apparatus 1030 inserted atop of solder reservoir 1020 and top cover 1040 installed on top. In the embodiment shown in FIG. 21 or other embodiments, the gas curtain can be generated by one or more diffuser tube containing one or more openings containing slots or perforations wherein a tube, a box, a triangle shape, or a combination of them with its length parallel to the width of the solder waves and with an inerting gas flow from one or two ends. The narrow slots or small perforated holes allow for a strong gas injection, thereby forming a gas curtain comprising the inerting gas. In this or other embodiments, the slotted or perforated diffuser tube may comprise a porous tube or a porous layer inside the tube to minimize pressure drop along the length of the slotted or perforated diffuser. Referring now to FIG. 22a, a slotted diffuser tube 1050 contains one or more openings or slots 1060, which can be used alone (as shown) or inserted within a porous diffuser (not show) to generate gas curtain. As an alternative example, FIG. 22b shows a cross section of a diffuser box 1070 with its top surface 1075 made of a porous plate and the other three surface made of solid plates 1078. FIG. 22b also shows a cross section of a gas director 1080 in a triangle shape, which contains open slots on the bottom surface and the top edge 1090 of the triangle 1080. The bottom surface of the triangle shaped gas director 1080 is directly contacted with the pores contained within the surface 1075 to allow fluid communication with diffuser box 1070 and inject gas uniformly along the length of the diffuser.

While the apparatus and method has been described in detail and with reference to specific examples and the embodiments thereof, it will be apparent to one skilled in the art that various changes and modifications can be made therein without departing from the spirit and scope thereof.

EXAMPLES

Example 1

Effect of Pore Size of Porous tube on Gas Flow Pattern

Three diffusers or porous tubes with three different grade levels as listed in the following table were tested. A lower grade represents a smaller pore size and porosity of the diffuser. The test was conducted by flowing house $N_2$ into each seamless porous tube and measuring pressures at the upstream ($P_{up}$) and downstream ($P_{down}$) of each diffuser for a given $N_2$ flow rate. The pressure drop ($\Delta P$) along the diffuser is determined as follows:

$$\Delta P = P_{up} - P_{down}$$

The average pressure along the diffuser was then calculated as:

$$P_{ave} = (P_{up} + P_{down})/2$$

When $\Delta P/P_{ave}$ is much less than 1, the gas flow out of the diffuser tube can be considered as in a laminar flow pattern. In contrast, when $\Delta P/P_{ave}$ is close to 1, a turbulent gas flow is normally dominant. For certain embodiments, it is preferred that the porous tube provides a laminar gas flow pattern.

Figure 2:
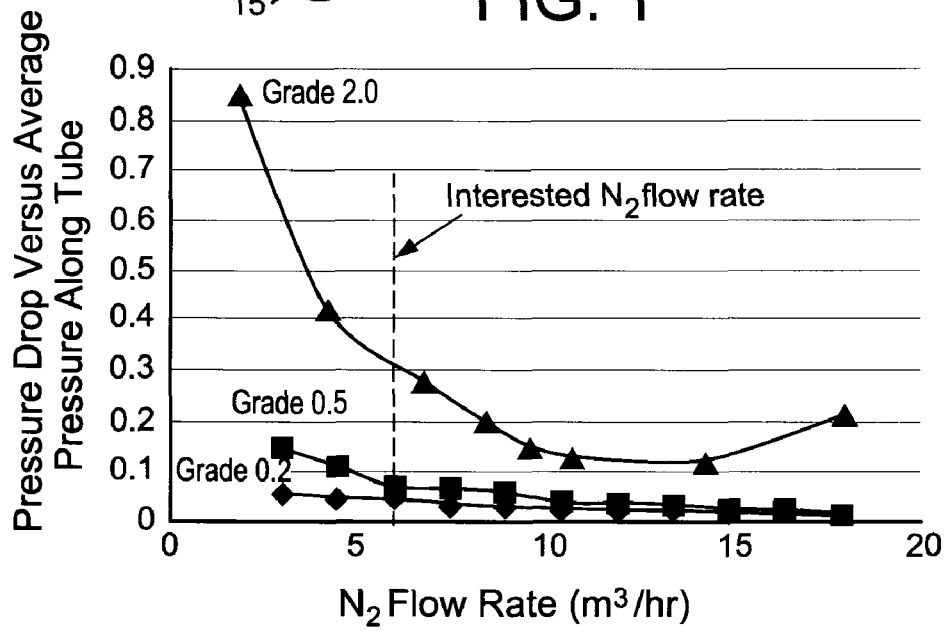
FIG. 2 shows the relationship between the pressure drop along the porous tube compared to the nitrogen ($N_2$) flow rate cubic meter per hour ($m^3$/hr) as influenced by pore size or grade level of the diffuser tube described in Example 1.

As indicated in Table I and FIG. 2, at the interested $N_2$ flow rate the $\Delta P/P_{ave}$ of 0.2 grade diffuser or porous tube is the smallest and is much below 1. Based on the result, the 0.2 grade diffuser was selected. The average pore size of the 0.2 grade diffuser is about 0.2 μm. FIG. 2 shows that at the $N_2$ flow rate of interest (e.g., about 6 m³/hr/diffuser), the porous tube having an average pore size of 0.2 μm or the 0.2 diffuser grade was optimal. By comparison, U.S. Pat. No. 6,234,380 teaches that that the preferred pore size range of its diffuser used for $N_2$ inerting in wave soldering is 0.3 to 2 μm or 0.4 to 0.6 μm, which is outside the optimal pore size for laminar flow.

TABLE I

Comparison of Porosity for Porous tubes

| Diffuser Grade | Internal Diameter | Outer Diameter | Length | Porosity (sheet) | Porosity (tube) |
|---|---|---|---|---|---|
| 0.2 | 0.25" | 0.375" | 18" | ~17% | ~24.5 |
| 0.5 | 0.25" | 0.375" | 18" | ~26% | ~28.7 |
| 2.0 | 0.25" | 0.375" | 18" | ~36% | ~36.7 |

Note:
Stainless steel of porous tubes compared was density 9 grams/cubic centimeter Example 2

Effect of Heated Diffuser for $N_2$ Inerting in Wave Soldering

In this example, at least one of the porous tubes is located between the two soldering waves and has a metal fin that is inserted into the molten solder reservoir, so that the temperature of the porous tube diffuser can be maintained above the solder's melting point. This heated diffuser can avoid potential clogging problems such as by solder splashing/solidification and by flux vapor condensation on diffuser surface. An example of the configuration used for this experiment is shown in FIG. 9.

Figure 18:
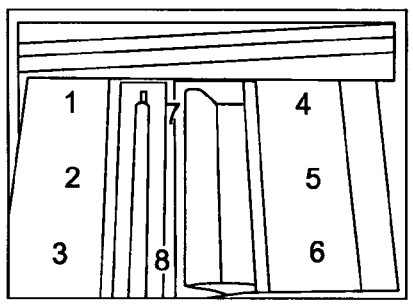
FIG. 18 provides a picture demonstrating the eight positions that were to used to measure $O_2$ concentration in Example 2.
Figure 19:
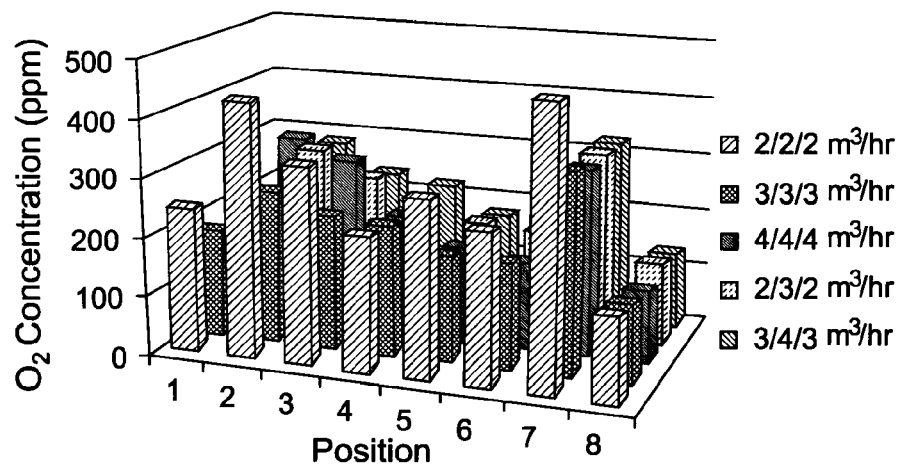
FIG. 19 provides the results of $O_2$ concentration for positions 1 through 8 shown in FIG. 18 for the apparatus having a plurality of porous diffuser tubes wherein one of the plurality of tubes had a metal protrusion in contact with the solder bath described in Example 2 and wherein the optional cover is not in place atop of the apparatus and work piece on moving track.
Figure 20:
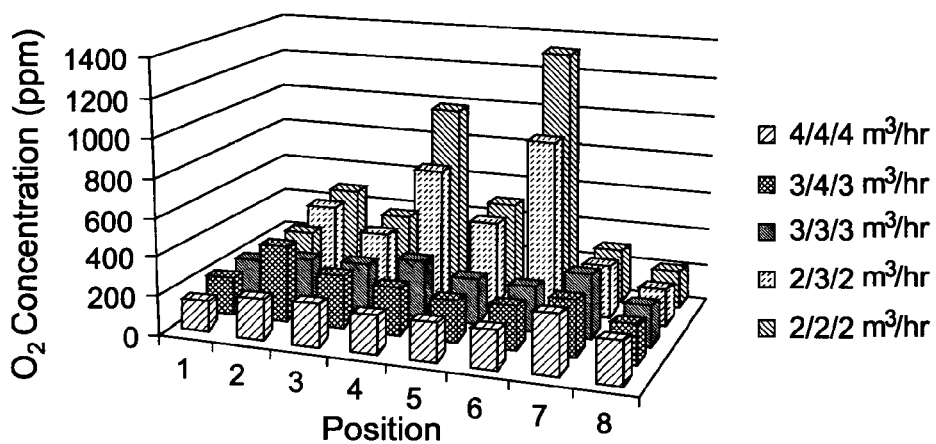
FIG. 20 provides the results of $O_2$ concentration for positions 1 through 8 shown in FIG. 18 for the apparatus having a plurality of porous diffuser tubes wherein one of the plurality of tubes had a metal protrusion in contact with the solder bath described in Example 2 and wherein the optional cover with ventilation connected is in placed atop of the apparatus and work piece on moving track.

FIG. 19 provides the results of $O_2$ concentrations around the solder reservoir in positions 1 through 8 designated in FIG. 18 with a static board on top of the solder reservoir and without the top cover (such as that shown in FIG. 5) and FIG. 20 repeats the $O_2$ analysis with the top cover and ventilation on (such as that shown in FIG. 5). Based upon visual observation, any soldering splash on the porous tube surface could not be solidified in both cases. The solder drop splashed on the center diffuser surface automatically dripped down due to its intrinsic nature of high surface tension and non wetting on diffuser surface. In addition, there was no evidence of flux vapor condensation on the diffuser surface. FIG. 19 shows that the $O_2$ concentrations near the molten solder waves are quite low for very small amount of $N_2$ flow rates, and the performance can be maintained over time since the diffuser clogging was eliminated. Similarly, FIG. 20 shows that even with ventilation on, the $O_2$ concentrations near the molten solder waves are also low for very small amount of $N_2$ flow rates, and the performance can be maintained over time since the diffuser clogging was eliminated. Because of the presence of the metal fin, the diffuser tube may be positioned relatively closer to the molten solder surface thereby providing a more effective purging of air out of the solder reservoir.

Example 3

Application of Non-Stick Porous Sleeve to Center Diffuser Tube

In this example, at least one of the porous tubes is located between the two soldering waves and has a metal fin that is inserted into the molten solder reservoir, so that the temperature of the porous tube diffuser can be maintained above the solder's melting point. This heated diffuser can avoid potential clogging problems such as by solder splashing/solidification and by flux vapor condensation on diffuser surface. An example of the configuration used for this experiment is shown in FIG. 9.

The center diffuser tube was covered with a sleeve made of ePTFE (expandable polytetrafluoroethylene). The ePTFE was formed in a tube shape and white color made by Phillips Scientific Inc. with item number TB3000. The porous tube is expandable only along the length of the tube, but non-expandable along the diameter direction. The material can survive 315° C. and has an average pore size around 2 to 10 micron meters. The wall thickness of the tube can range from 0.001" to 0.002".

The ePTFE sleeve on the porous diffuser tube was dipped in the molten solder pot at 260° C. The sleeve exhibited no visible change.

The ePTFE sleeve on a 12" long diffuser was connected to a $N_2$ source of 85 psig. There is no problem in providing a $N_2$ flow rate of 4 $NM^3$/Hr from the diffuser with the sleeve on the surface.

A diffuser (12" long and 3/8" outer diameter (O.D.)) with an ePTFE sleeve was installed as a center diffuser in the apparatus described herein with a $N_2$ flow rate of 4 $NM^3$/Hr on the center diffuser. The apparatus was then mounted on the molten solder pot of 260° C. with two solder waves running which touched the thermal fin of the center diffuser. A liquid flux was continually sprayed on the ePTFE surface of the center diffuser. It was found through visual examination that the ePTFE was completely non-sticking to the liquid flux and the molten solder sprayed on the ePTFE sleeve of the center diffuser could drip down easily into the solder pot.\

The invention claimed is:

1. A method for providing an inerting gas atmosphere during wave soldering of a work piece, the method comprising:
   providing a wave soldering machine comprising: a solder reservoir having molten solder contained therein, at least one nozzle, at least one pump to generate at least one solder wave from the molten solder bath upwardly through the nozzle; placing an apparatus atop at least one edge of the solder reservoir wherein the apparatus comprises at least one opening on a top surface, at least one groove that rests atop the at least one edge of the solder reservoir, and a plurality of tubes comprising one or more openings in fluid communication with an inerting gas source, wherein the work piece to be soldered and the top surface of the molten solder define an atmosphere and wherein there is substantially no gap between the work piece to be soldered and the apex of the at least one solder wave;
   passing a work piece along a path so that at least a portion of the work piece contacts the at least one solder wave emitting through the opening of the apparatus;
   introducing an inerting gas through the tubes and into the atmosphere; and
   wherein at least one of the tubes contacts a portion of a thermally conductive protrusion which is inserted into the molten solder whereby the at least one tube is heated to a temperature that is above the melting point of the molten solder.

2. The method of claim 1 wherein the thermally conductive protrusion comprises a metal fin.

3. The method of claim 1 wherein the at least one tube resides proximal to the at least one solder wave.

4. The method of claim 1 further comprising a cover that the work piece travels therethrough wherein the cover further comprises a vent which is in communication with a ventilation system.

5. The method of claim 4 wherein the cover comprises a plurality of sheets that define an interior volume and wherein the interior volume is in fluid communication with the ventilation exhaust of a soldering furnace.

6. The method of claim 5 wherein the cover further comprises an inlet in fluid communication with the inerting gas source.

7. The method of claim 1 wherein the opening comprises pores and wherein an average pore size of the porous tube is 0.2 μms or less.

8. The method of claim 1 wherein the apparatus comprises a plurality of grooves wherein the grooves define a plurality of chambers wherein the tubes reside.

9. The method of claim 1 wherein the solder reservoir generates a plurality of solder waves and at least one tube is interposed between the solder waves.

10. The method of claim 1 wherein the inerting gas comprises nitrogen.

11. The method of claim 10 wherein the inerting gas further comprises 5% by weight or less of hydrogen.

12. The method of claim 1 wherein the inerting gas comprises a gas selected from the group consisting of nitrogen, hydrogen, helium, neon, argon, krypton, xenon, and combinations thereof.

* * * * *